(No Model.)
T. A. EDISON.
REGULATOR FOR DYNAMO ELECTRIC MACHINES.
No. 264,667. Patented Sept. 19, 1882.
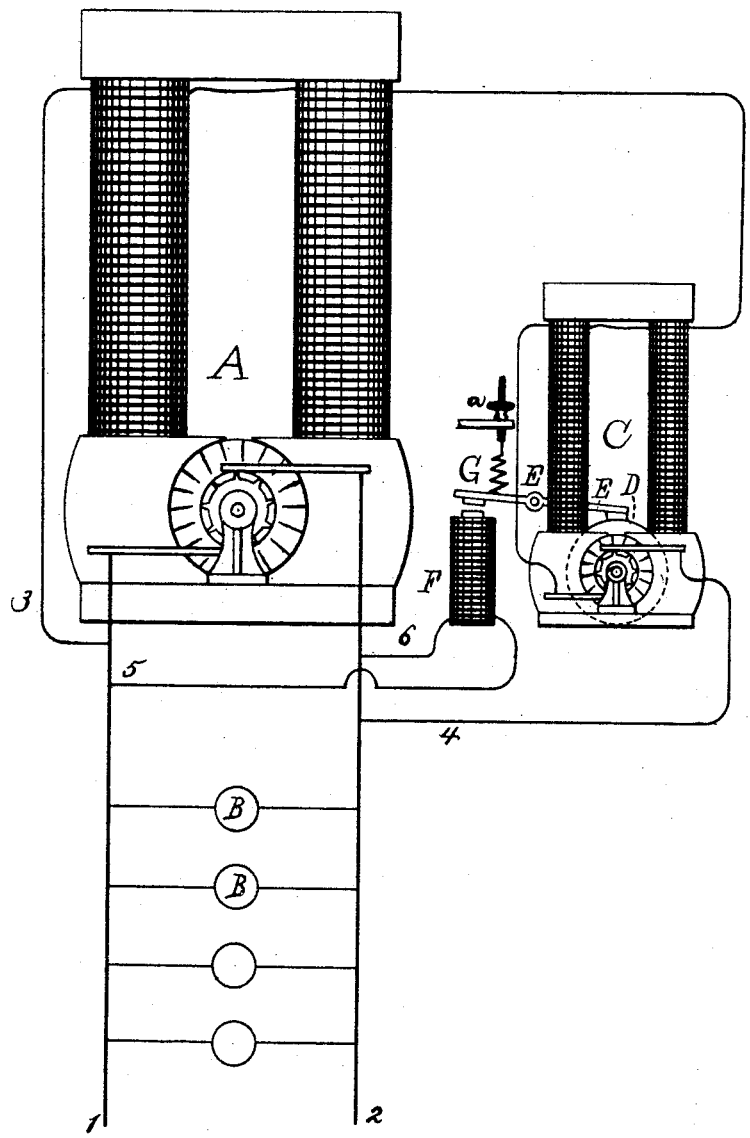
WITNESSES:
E. C. Rowlands
H. W. Seely
INVENTOR:
T. A. Edison
BY Rich'd N. Dyer
ATTORNEY

UNITED STATES PATENT OFFICE.

THOMAS A. EDISON, OF MENLO PARK, NEW JERSEY.

REGULATOR FOR DYNAMO ELECTRIC MACHINES.

SPECIFICATION forming part of Letters Patent No. 264,667, dated September 19, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Means for Regulating Electrical Generators, (Case No. 425;) and I do hereby declare that the following is a full and exact description of the same, reference being had to the accompanying drawings, and to the letters of reference marked thereon.

This invention relates to means for regulating the generative capacity of a dynamo or magneto electric machine by throwing into the circuit of the field-magnet a variable and controllable counter electro-motive force, and is an improvement upon the special means for this purpose described in my Patent No. 248,421.

The object I have in view is to produce a simple and efficient mechanism operating upon this principle which will regulate both for variations in the speed of the engine and in the number of translating devices. This I accomplish by arranging a motor directly in the field-circuit, and by regulating it or controlling its regulation by an electro-magnet arranged in multiple arc, so that it will be affected both by variations in speed and in number of translating devices. A friction-brake is arranged to bear upon a large wheel located directly on the shaft of the motor-armature or on a shaft connected with such armature-shaft, and having a higher rate of speed than the armature-shaft. This friction-brake is forced upon the wheel by a spring or weight, which is made adjustable to give more or less pressure normally, so that the candle-power of the lamps can be adjusted. The magnet arranged in multiple arc from the main conductors of the machine operates against the spring or weight, and tends to relieve the pressure of the brake and allow the motor to run with greater speed and throw a greater counter electro-motive force into the field-circuit, thereby weakening the field-magnet. As the magnet grows weaker it allows the spring or weight to force the brake with greater pressure upon the wheel, reducing the speed of the motor and the counter electro-motive force generated by it. The electro-magnet which opposes the action of the spring or weight of the brake may be placed in a local circuit, as in a shunt from the main line or from the field-circuit, and have its circuit closed and opened by the armature of a controlling relay-magnet placed in a multiple-arc circuit from the main conductors. The electro-magnet in the multiple-arc circuit being affected in the same way as are the lamps by changes in speed and in number of lamps, the local circuit will be opened and closed accordingly, and the regulation will be efficient in all respects.

The foregoing will be better understood from the drawing, which is a view, partly diagrammatic, of apparatus embodying the invention.

A is a dynamo or magneto electric machine, from which run the main conductors 1 2 in multiple-arc circuits, from which are located the lamps or other translating devices, B. The field-circuit 3 4 of A is preferably a multiple-arc circuit from 1 2, and in it is located the electro-dynamic motor C. Upon the armature-shaft of the motor is a large wheel, D, upon which bears a pivoted brake-lever, E. This lever, at its other end, carries an armature attracted by an electro-magnet, F, located in a multiple-arc circuit, 5 6, from the main conductors 1 2. The brake-lever is lifted off of the brake-wheel by the attraction of this electro magnet, the force of which is opposed by a spring, G, made adjustable in its tension by a nut, *a*, or other suitable means, so that the candle-power of the lamps can be adjusted. If the magnet F were in a local circuit controlled by a relay-magnet arranged in multiple arc, as before explained, and as shown in Fig. 2 of Case No. 68,628, of even date herewith, the means for adjusting the candle-power would be used in connection with the relay-magnet.

What I claim is—

1. The combination, with a dynamo or magneto electric machine, of an electromotor located in the field-circuit and varying the strength of the field-magnet by variations in its counter electro-motive force, and an electro-magnet arranged in a multiple-arc circuit from the conductors of the generator, for controlling the speed of the motor, whereby the generator will be regulated to meet changes in speed, as well as the varying conditions of the external circuit, substantially as set forth.

2. The combination, with a dynamo or magneto electric machine, of an electromotor located in its field-circuit and adjustable means for regulating or controlling the speed of such motor, substantially as set forth.

3. The combination, with a dynamo or magneto electric-machine, of an electromotor located in its field-circuit and a friction-brake controlled by an electro-magnet for regulating the speed of such motor, substantially as set forth.

4. The combination, with a dynamo or magneto electric machine, of an electromotor located in its field-circuit, a friction-brake forced by a spring or weight upon a wheel mounted upon or connected with the motor-shaft, and an electro-magnet opposing the action of such spring or weight and located in a multiple-arc circuit from the main conductors of the generator, substantially as set forth.

This specification signed and witnessed this 22d day of May, 1882.

THOMAS A. EDISON.

Witnesses:
EDUARD C. ROWLAND,
C. P. MOTT.